UNITED STATES PATENT OFFICE.

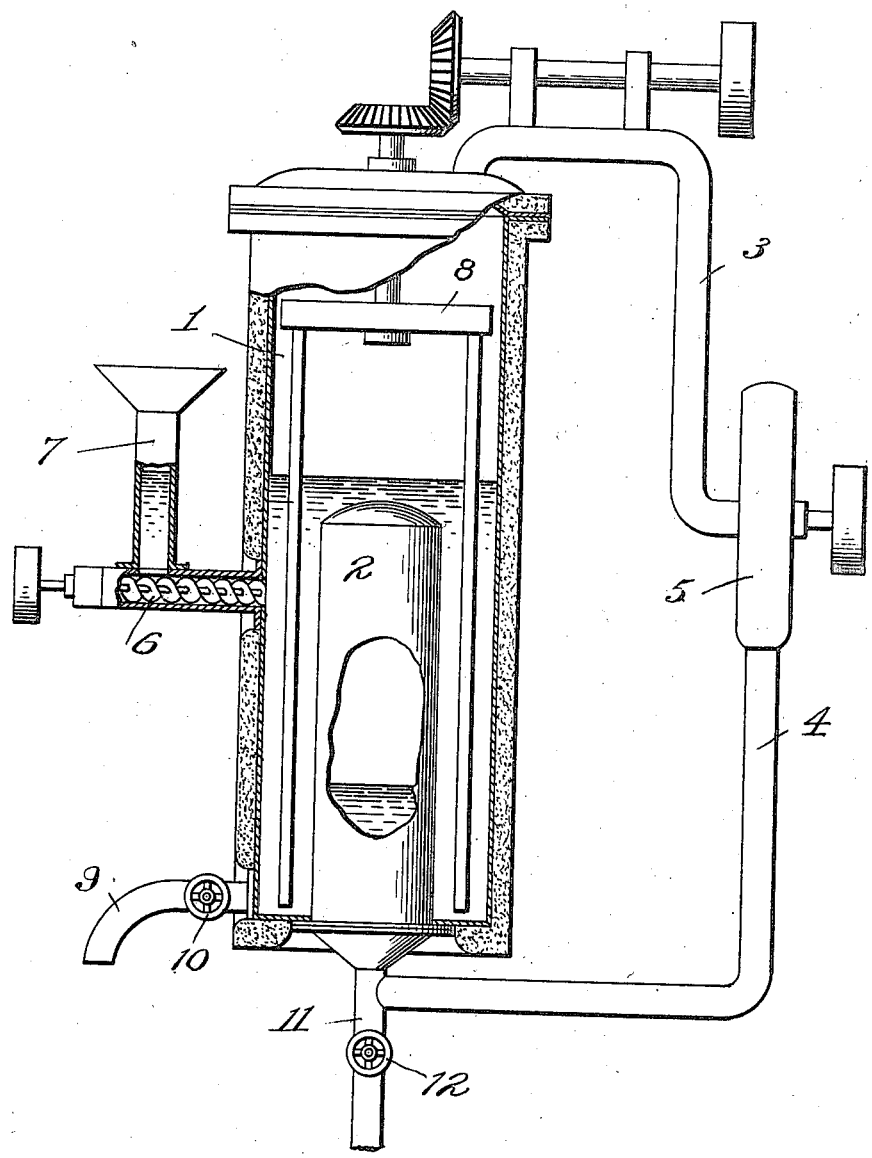

CHARLES S. BRADLEY, OF NEW YORK, N. Y.

METHOD AND APPARATUS FOR CONSERVING HEAT OF CHEMICAL ACTION.

1,209,258. Specification of Letters Patent. Patented Dec. 19, 1916.

Application filed February 26, 1915. Serial No. 10,732.

*To all whom it may concern:*

Be it known that I, CHARLES S. BRADLEY, a citizen of the United States, residing in the city, county, and State of New York, have invented certain new and useful Improvements in Methods and Apparatus for Conserving Heat of Chemical Action, of which the following is a full and clear specification.

My invention relates in general to chemical processes and more especially to those in which endothermic and exothermic actions occur.

In endothermic chemical reactions, a considerable number of heat units are absorbed, which must be supplied from an outside source of heat and hence represent an element of cost in the chemical process. In exothermic chemical reactions, a considerable number of heat units are evolved and this evolution of heat frequently occurs at a point in the process where the consequent rise in temperature is objectionable and the excess heat must be removed. Heretofore this evolved heat has usually been discharged from the system as waste heat with consequent inefficiency of the system, and furthermore in many cases it has involved recourse to special expedients for its removal and constitutes an objectionable feature in the process.

According to my invention, in its broader aspect, the objections above noted are substantially avoided by so conducting a process including both endothermic and exothermic chemical actions, that the quantity of heat represented in the chemical change is maintained within the system, so that the necessity for supplying heat from an outside source is largely avoided while at the same time the waste of the evolved heat and the necessity of providing special means for discharging the evolved heat from the system are no longer present.

The broad principles of the invention may be employed with special advantage in connection with chemical actions, which are reversible according to physical conditions, such as temperature and pressure. Many of these reactions are endothermic or exothermic and where the first reaction leads to the production of gases which are capable of taking part in a subsequent reaction at higher pressure and temperature, a highly advantageous system for conserving the heat of chemical action may be derived. Such an embodiment of the invention will conveniently serve as an illustration of the principles thereof and I shall describe the same with reference to the accompanying drawing of an apparatus, in which endothermic and exothermic reaction chambers are in heat conductive relation with each other and the gases produced in one are pumped into the other at higher temperature and pressure to cause a reversal of the chemical action and regeneration of the chemical heat units.

Said drawing shows the apparatus in elevation, with parts in vertical section.

Referring more specifically to said drawing, 1 indicates an endothermic chemical reaction chamber and 2 an exothermic chemical reaction chamber in heat conductive relation therewith, the two chambers being in communication with each other by way of pipes 3 and 4, which lead to and from the compressor 5. A feed device 6 supplied by hopper 7 delivers the materials to endothermic chamber 1, whereas pipes 3 and 4 and compressor 5 constitute the supply conduit for the exothermic chamber 2. A stirring device 8 serves to mix the contents of the endothermic chamber 1. The solution in chamber 1 may be drawn off through discharge pipe 9 suitably controlled as by valve 10 and the contents of the chamber 2 may be discharged through pipe 11 under suitable control as, for example, by valve 12.

The materials are fed into chamber 1 by way of feed device 6, and the temperature and pressure are maintained in chamber 1, at such a point as to give rise to an endothermic reaction in which gaseous products are generated. These gaseous products are withdrawn from chamber 1 by means of compressor 5, by way of pipes 3 and 4 and forced into the exothermic chamber 2 under increased pressure and temperature, whereupon an exothermic combination occurs. As an example of the materials and reactions I may refer to the production of ammonia gas, carbon dioxid and water vapor from barium carbonate and ammonium chlorid solution, (which constitutes an endothermic chemical action) and the subsequent recombination of the carbon dioxid and ammonia gas with water to form ammonium carbonate (which constitutes an exothermic chemical action). The barium carbonate and ammonium chlorid with water are introduced into the hopper 7 from which the feed device 6 advances them into the endothermic chamber 1. At the normal boiling temperature and pressure maintained in chamber 1, the barium carbonate and ammonium chlorid react to produce calcium chlorid, ammonia gas and carbon dioxid, as follows:

$$BaCO_3 + (NH_4)_2Cl_2 = 2NH_3 + CO_2 + H_2O + BaCl_2$$

Water is also evaporated in chamber 1 so that a gaseous mixture of ammonia, carbon dioxid and water are drawn over by compressor 5 and forced into chamber 2 at higher pressure and temperature. The reaction is thereupon reversed, the ammonia, carbon dioxid and water form ammonium carbonate.

$$2NH_3 + CO_2 + H_2O = (NH_4)_2CO_3$$

There will be an excess of water vapor in the gaseous mixture coming from chamber 1, so that the ammonium carbonate thus produced is obtained in the form of a solution in chamber 1. The dissociation taking place within chamber 1 absorbs a considerable quantity of heat which, however, is again evolved in the subsequent formation of ammonium carbonate in chamber 2. The heat evolved in chamber 2 passes through the walls thereof and is thus constantly restored to the materials taking part in the chemical action in chamber 1. It will be observed that the chamber 1 is sealed by the liquid in hopper 7. The withdrawal of the barium chlorid solution from chamber 1 may take place continuously or intermittently under control of valve 10. There will also be some sediment of a silicious nature, which will also be discharged through pipe 9. The ammonium carbonate solution formed in chamber 2 is withdrawn either continuously or intermittently through pipe 11, under the control of valve 12.

The inefficiency of the compressor 5, due to friction, is not here all wasted as in ordinary pumping operations, inasmuch as the additional heat produced by friction in the compressor will assist in making up radiation losses. The apparatus is, furthermore, heat-insulated, as shown, with suitable material so as to maintain the heat units within the system as far as possible. The heat of compression generated by the compressor is also useful in the system. Some or all of the materials fed into the system by way of the hopper 7 may be previously heated to such an extent as to maintain a substantial thermal balance within the apparatus. It will be obvious that the exothermic step may be performed prior to the endothermic operation in the system without departing from the principles of the invention.

In practice I prefer to introduce a charge of the required materials into the chamber 1 and complete the operation upon these before introducing additional quantities of the raw materials. In this way the completeness of the reaction is better assured, and the solutions from the two chambers may be discharged between successive charges.

I claim:

1. The method of conducting chemical processes involving endothermic and exothermic reactions which comprises performing an endothermic dissociation step upon chemical substances and subsequently performing an exothermic recombination of dissociated constituents produced thereby, in heat conductive relation with the dissociating step, whereby the endothermic and exothermic heat quantities are conserved within the system.

2. The method of conducting chemical processes which comprises performing an endothermic chemical action in which gaseous products are produced, removing the gaseous products therefrom and compressing them into a reaction chamber in heat conductive relation with the endothermic action, and causing an exothermic action involving said gaseous products whereby the chemical heat units are restored to the materials engaged in the endothermic action.

3. The method of conducting reversible chemical processes involving endothermic and exothermic reaction which comprises maintaining with respect to suitable chemical materials the temperature and pressure conditions determinative of an endothermic chemical action, removing from the locus of such action resulting products capable of taking part under suitable physical conditions in an exothermic chemical reversal action, and establishing and maintaining the temperature and pressure of such products determinative of such exothermic reaction while the materials taking part therein are in heat conductive relation with the materials taking part in the endothermic reaction.

4. The method of conducting reversible chemical processes involving endothermic and exothermic chemical action which comprises subjecting suitable materials to proper temperature and pressure to produce gaseous dissociation products in an endothermic reaction, removing the said products therefrom and compressing them in heat conductive relation with the materials taking part in the first reaction to cause an exothermic chemical reversal process involving them, whereby the chemical heat units are restored and conserved within the system.

CHARLES S. BRADLEY.

Witnesses:
 OCTAVIUS KNIGHT,
 LUELLA F. LITTLE.